United States Patent
Freund

(10) Patent No.: US 6,553,458 B1
(45) Date of Patent: Apr. 22, 2003

(54) INTEGRATED REDUNDANT STORAGE DEVICE

(75) Inventor: Frank Peter Freund, Poway, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/460,581

(22) Filed: Dec. 14, 1999

(51) Int. Cl.$^7$ ............................................. G06F 12/00
(52) U.S. Cl. ......................................... 711/114; 711/4
(58) Field of Search ................................ 711/114, 112, 711/4, 216; 714/6; 710/25, 33, 100; 709/321; 707/10; 361/685, 684; 360/97.1; 713/1; 717/11

(56) References Cited

U.S. PATENT DOCUMENTS

| | | | |
|---|---|---|---|
| 4,484,262 A | | 11/1984 | Sullivan et al. ............. 711/216 |
| 5,274,799 A | * | 12/1993 | Brant et al. ..................... 714/6 |
| 5,329,412 A | | 7/1994 | Stefansky .................. 360/97.1 |
| 5,349,661 A | | 9/1994 | Brewer et al. ................. 713/1 |
| 5,455,919 A | | 10/1995 | Brewer et al. ............. 709/321 |
| 5,469,573 A | | 11/1995 | McGill, III et al. .......... 717/11 |
| 5,485,606 A | | 1/1996 | Midgdey et al. ............. 707/10 |
| 5,696,933 A | | 12/1997 | Itoh et al. ................... 711/114 |
| 5,740,397 A | * | 4/1998 | Levy ........................... 711/114 |
| 5,742,752 A | * | 4/1998 | Dekoning ...................... 714/6 |
| 5,805,787 A | * | 9/1998 | Brant et al. ..................... 714/6 |
| 5,822,184 A | * | 10/1998 | Rabinovitz .................. 361/685 |
| 5,898,843 A | * | 4/1999 | Crump et al. ............... 710/100 |
| 5,898,891 A | * | 4/1999 | Meyer .......................... 710/33 |
| 5,938,744 A | * | 8/1999 | Roganti et al. ................ 710/25 |
| 6,018,456 A | * | 1/2000 | Young et al. ................ 361/684 |
| 6,112,276 A | * | 8/2000 | Hunt et al. .................. 711/112 |
| 6,115,788 A | * | 9/2000 | Thowe ........................ 711/114 |
| 6,188,571 B1 | * | 2/2001 | Roganti et al. ............. 361/685 |

* cited by examiner

*Primary Examiner*—David Hudspeth
*Assistant Examiner*—Fred F. Tzeng
(74) *Attorney, Agent, or Firm*—Gates & Cooper

(57) ABSTRACT

An apparatus and method for providing selectively redundant storage within a computer. The device comprises a first storage device having a first form factor and a first height, a second storage device having the first form factor and a second height, coupled to the first storage device, such that the first form factor, first height, and second height allow the first storage device and second storage device to fit within a standard cage of a computer, and a controller, coupled to the first and second storage device, for selectively storing data on the first storage device and the second storage device, wherein the controller interfaces to the computer and presents the first storage device and the second storage device as a single storage device to the computer. The method comprises coupling a first storage device to a computer through a controller, coupling a second storage device to the computer through the controller, such that the first storage device and the second storage device comprise a single storage device for the computer, storing data on the first storage device based on instructions received from the controller, and storing data on the second storage device based on instructions received from the controller.

12 Claims, 3 Drawing Sheets

INTEGRATED REDUNDANT STORAGE DEVICE

BACKGROUND OF THE INVENTION

1. Field of the Invention

This invention relates in general to computer storage systems, and in particular to an integrated redundant storage device.

2. Description of Related Art

Computer installations and usage have become commonplace in business and home alike. Storage of large amounts of data and programs is required to perform the complex data manipulation and analysis.

Typically, data is stored on hard drives. These hard drives are typically standalone units that can store hundreds of gigabytes (GBs) of data. However, if the drive fails or crashes, the information stored on the hard drive is lost.

Solutions to this single point failure have incorporated several approaches. One approach is to provide a Redundant Array of Inexpensive Devices (RAID) which uses each device or hard drive to store portions of the data in a redundant fashion. RAID has several "levels" of redundancy, which provides additional protection for the data stored on the hard drives. The RAID approach uses expensive external array controllers to manage multiple hard disk drives in a redundant fashion.

A second approach makes use of inexpensive adapter boards that reside on the host computer's I/O bus to manage multiple drives in a redundant fashion. Another approach makes use of software drivers in the host computer to implement protected storage.

The problem with the RAID external controller approach is the expense and difficulty of housing the RAID controllers. The RAID controllers are large and powerful to allow the cost of the RAID to be amortized over the largest number of drives. The resulting storage systems are often more expensive than the host computer systems to which they are attached.

The I/O adapter approach circumvents the RAID problems by placing the controller within the host computer, thus using existing power and mechanical subsystems. However, since I/O slots are typically limited, numerous drives are again attached to the computer system. Additionally, the I/O approach cannot tolerate the failure of the host computer system due to the tight integration; critical disk state information needed for sharing the storage with another host computer is lost when the host fails. This eliminates this approach for anything but single host systems.

The software driver approach also makes use of the host computer system's computational and I/O resources to implement the data redundancy algorithms. This is the lowest cost approach, but results in a system performance degradation that is typically not acceptable. This approach also suffers from the disadvantage of the I/O adapter approach, namely, that critical disk state information is lost when the host fails, eliminating the ability to share the storage among multiple host computers.

All of these approaches suffer from degradation of the performance of the system when contrasted with the performance available from the storage incorporated into such systems. This is due primarily to the sharing of resources needed to implement protected storage among a large number of disk drives.

It can be seen, then, that there is a need in the art for redundant storage capability. It can also be seen that there is a need in the art for redundant storage capability that does not degrade system performance. It can also be seen that there is a need in the art for redundant storage capability that is inexpensive to implement.

SUMMARY OF THE INVENTION

To overcome the limitations in the prior art described above, and to overcome other limitations that will become apparent upon reading and understanding the present specification, the present invention discloses an apparatus and method for providing selectively redundant storage within a computer. The device comprises a first storage device having a first form factor and a first height, a second storage device having the first form factor and a second height, coupled to the first storage device, such that the first form factor, first height, and second height allow the first storage device and second storage device to fit within a standard cage of a computer, and a controller, coupled to the first and second storage device, for selectively storing data on the first storage device and the second storage device, wherein the controller interfaces to the computer and presents the first storage device and the second storage device as a single storage device to the computer.

The method comprises coupling a first storage device having a first form factor and a first height to a computer through a controller, coupling a second storage device having the first form factor and a second height to the computer through the controller, such that the first storage device and the second storage device comprise a single storage device for the computer and fit within a standard cage of the computer, storing data on the first storage device based on instructions received from the controller, and storing data on the second storage device based on instructions received from the controller.

An object of the present invention is to provide redundant storage capability. Another object of the present invention is to provide redundant storage capability that does not degrade system performance. Another object of the present invention is to provide redundant storage capability that is inexpensive to implement.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to the accompanying detailed description, in which there is illustrated and described specific examples of a method and apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention is a blending of current disk array and disk drive technology. The current state of the art in supplying protected data storage for computer systems is concentrated in three different approaches. The first approach uses expensive external array controllers, e.g., RAID controllers, to manage multiple disk drives in a redundant fashion. The second makes use of inexpensive adapter boards that reside on the host computer's I/O bus to manage multiple drives in a redundant fashion. The final approach makes use of software drivers in the host computer to implement protected storage.

All of these approaches suffer from degradation of the performance of the system when contrasted with the performance available from the storage incorporated into such systems. This is due primarily to the sharing of resources needed to implement protected storage among a large number of disk drives.

The present invention solves these problems by integrating two disk drives into a unit that appears, to the computer, as a single disk storage device.

Hardware Environment

Figure 1:
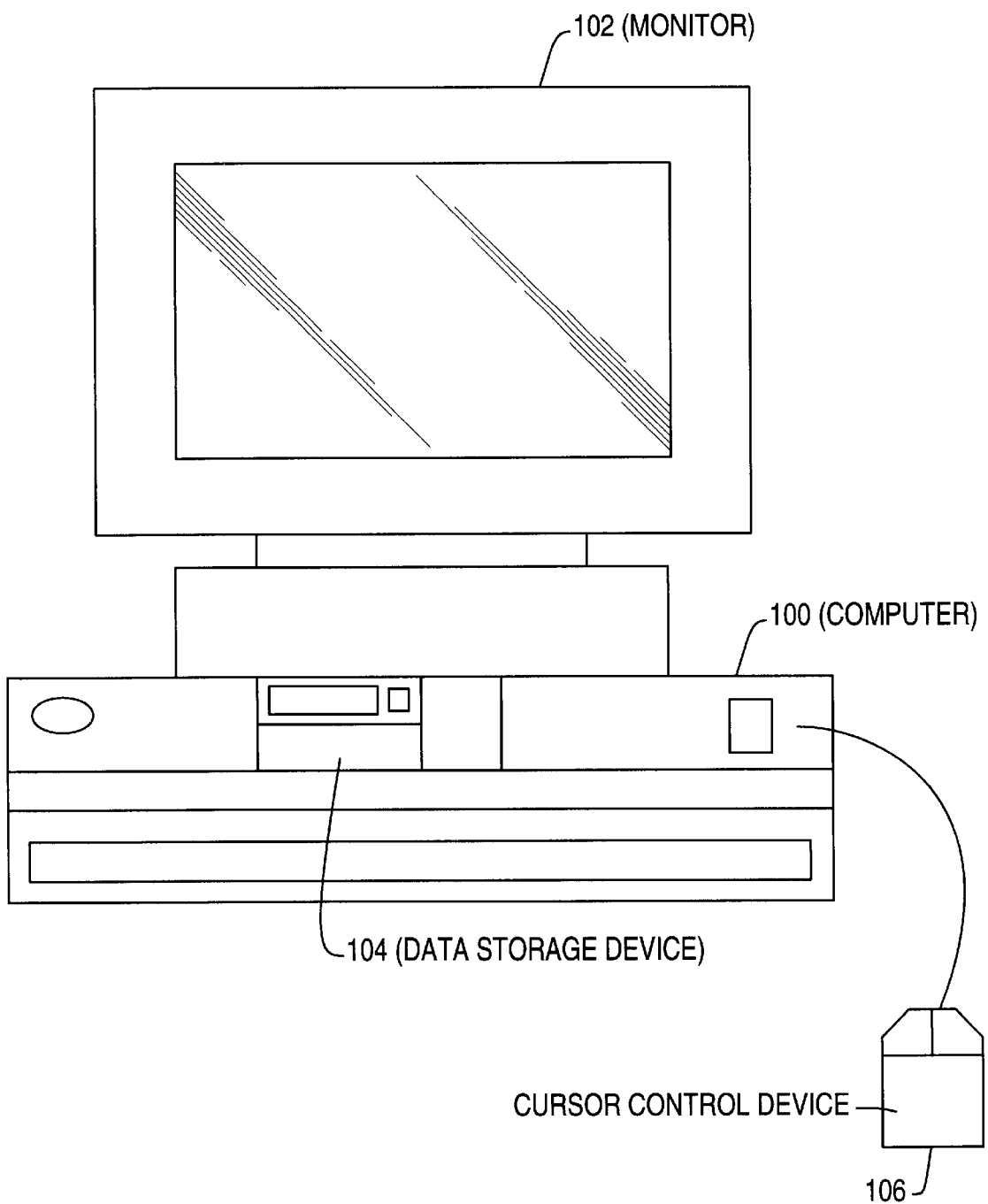
FIG. 1 is an exemplary hardware environment used to implement the preferred embodiment of the invention.

FIG. 1 is an exemplary hardware environment used to implement the preferred embodiment of the invention. FIG. 1 is an exemplary hardware and software environment used to implement the preferred embodiment of the invention. The preferred embodiment of the present invention is typically implemented using a computer 100, which generally includes, inter alia, a monitor 102, data storage devices 104, cursor control devices 106, and other devices. Those skilled in the art will recognize that any combination of the above components, or any number of different components, peripherals, and other devices, may be used with the computer 100.

Those skilled in the art will recognize that the exemplary environment illustrated in FIG. 1 is not intended to limit the present invention. Indeed, those skilled in the art will recognize that other alternative environments may be used without departing from the scope of the present invention.

DETAILED DESCRIPTION OF THE PRESENT INVENTION

Figure 2:
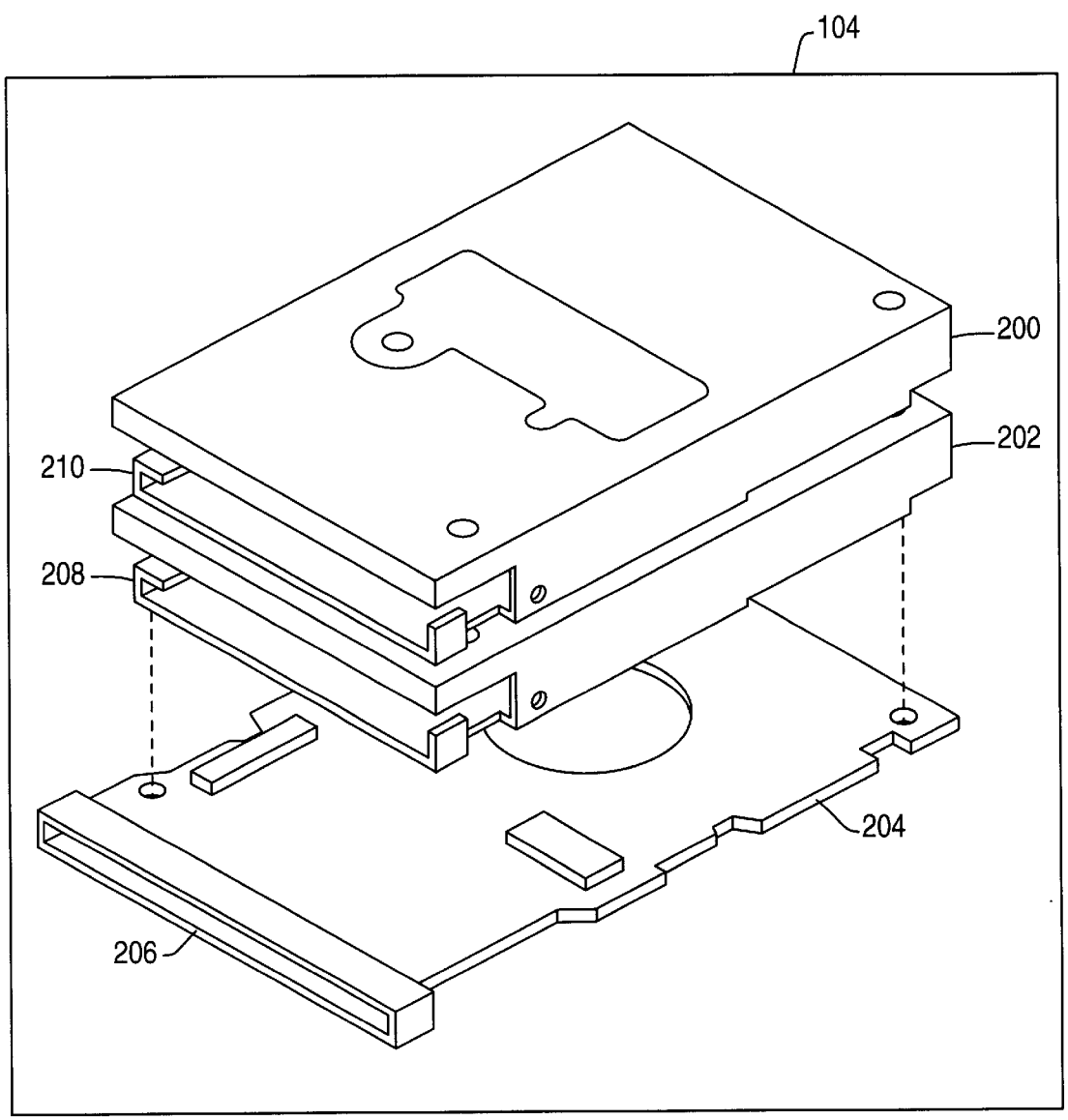
FIG. 2 illustrates the implementation of the present invention.

FIG. 2 illustrates the implementation of the present invention. The invention replaces a conventional storage device 104 with multiple components, comprising a first storage device 200, a second storage device 202, and a controller 204. The controller 204 can be an external controller 204 as shown, or can be the internal controller that exists within the first storage device 200 and second storage device 202 to provide the selective redundancy within the storage device 104. The selective redundancy of storage device 104 is equivalent to the functionality of a RAID 0/1 controller 204. Further, first storage device 200 and second storage device 202 can be selected from hard disk drives, CD ROM drives, tape drives, or other magnetic, optical, or mechanical storage devices 104. The storage devices 200 and 202 do not have to be of the same type, e.g., first storage device 200 can be a disk drive and second storage device 202 can be a CD ROM drive, so long as controller 204 can interface the storage of data between the storage devices 202 and 204.

As shown in FIG. 2, the storage device 104 can be implemented with the second storage device 202 being arranged adjacent to the first storage device 200 in a stack, such that the first and second storage device 200, 202 are positioned in parallel planes of the stack. The controller 204 can be horizontally oriented and positioned in a parallel plane adjacent the first and second storage devices 200, 202 in the stack. The length and width of the controller are co-extensive with the first and second lengths and first and second widths of the first and second storage devices 200, 202 in the stack.

The interface between the storage device 104 and computer 100 is achieved through a single storage device interface 206. The interface 206 can be implemented by retaining one of the existing interfaces 208–210 of the storage devices 200 and/or 202, to allow a host computer 100 to attach to the storage device 104 in a manner substantially identical to that used for a single storage device 104. Alternatively, the redundant interfaces 208 and 210 can both be used to provide multiple attachments to computer 100 to provide protection against interface failure. Single and redundant power supply to the disk drives can be similarly achieved by using the existing power connections of the interfaces 208 and 210. The interface 206 can also be made through controller 204 if desired.

If internal space is at a premium, such as with computers 100 that are laptop computers, palm computing platforms, etc., only the storage device 200 and 202 drive assemblies are retained from the component storage devices 200 and 202. These assemblies are mated with a new controller 204 that provides the selective redundancy function in conjunction with the drive control functionality of the replaced controllers of devices 200 and 202.

Storage devices 200 and 202 appear to be a single storage device 104 to computer 100 and any other computer 100 that interfaces to controller 204 or to interfaces 206, 208, or 210. Further, the standard 5.25 inch form factor of storage devices 200 and 202, along with the standard height requirements for such devices, make storage device 104 fully integrable with personal computers 100, laptop computers 100, etc. and provide such computers 100 with redundant storage capabilities that are currently not available. The heights of the storage devices 200 and 202 are such that the storage device 104 fits within a standard card cage of a personal computer 100 or a laptop computer 100. The redundant storage capabilities that are provided by storage device 104 of the present invention are also programmable by the user to allow for increase storage capacity instead of redundancy, if that is more desirable to the user.

By providing an inexpensive controller 204 that is optimized to control only two storage devices 200 and 202, the present invention embeds selective redundancy into the storage device 104. When implemented, the resultant storage device 104 in accordance with the present invention is indistinguishable from a typical storage device 104, other than by its improved performance or fault tolerance characteristics. The present invention creates an inexpensive fault-tolerant computer storage device that can be shared among multiple host computers 100.

Further, the present invention can selectively provide redundancy or increased storage space within the same form factor of other storage media. By integrating two independent storage devices 200 and 202 with a simple add-on controller 204, or by cross-correlating the existing controllers imbedded into independent storage devices 200 and 202 into a storage device 104 that appears as a single storage device 104 to the host computer 100, the present invention provides flexibility to the computer 100. The storage device 104 that contains two discrete storage devices 200 and 202 can be used in a serial mode, where the storage capacity of both storage devices 200 and 202 are combined to create a larger storage capacity for the resultant storage device 104, e.g., a storage device 200 that has a capacity of 200 MB and a storage device 202 that has a storage capacity of 300 MB can be combined using the present invention to create a single resultant storage device 104 that has a capacity of approximately 500 MB. This approach is equivalent to RAID level 0 storage.

However, the controller 204, or the imbedded cross-coupled controllers of storage devices 200 and 202, can be used to create redundant storage between storage devices 200 and 202. Since two storage devices 200 and 202 are available within a single storage device 104, RAID level 1 protected redundant storage can be created. Further, the use of two independent storage devices 200 and 202, up to a twofold increase in random I/O performance can be obtained when compared to the performance of a single disk drive of the same storage capacity.

The physical form factor of the storage devices 200 and 202 and controller 204 is such that as an integrated unit, the resultant storage device 104 mimics a larger standard form factor storage device 104, e.g., two quarter or half height devices 200 and 202 combine to form a full height storage device 104 or two quarter height devices 200 and 202 combine to form a half-height device 104. The benefits of this approach are that performance is similar to the maximum achievable from the individual devices 200 and 202 because only two devices 200 and 202 are being managed by the controller 204. Further, the cost is minimal because the controller 204 only needs to be complex enough to manage the operation of two devices 200 and 202. The present invention also allows the storage of devices 200 and 202 to be shared among multiple computers 100 because state information is maintained at the storage device 104. The present invention can be used to replace existing non-protected storage devices in an upgrade manner because the resultant storage device 104 has a compatible form factor with present computer 100 installations. Finally, if desired, the present invention can be selectively used in a non-protected manner to increase the random operation performance of the storage device 104.

Figure 3:
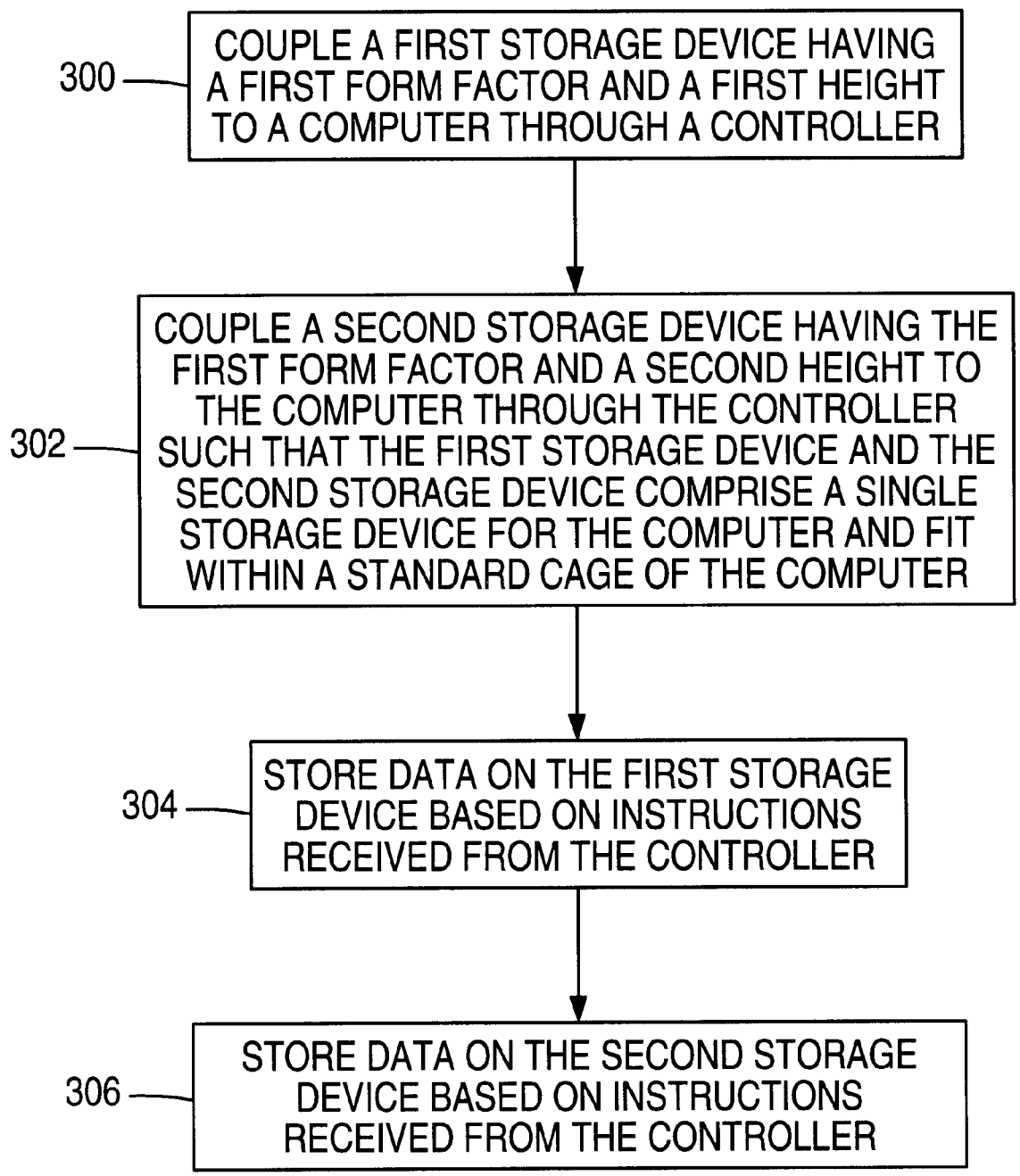
FIG. 3 is a flow chart illustrating the steps used to practice the present invention.

FIG. 3 is a flow chart illustrating the steps used to practice the present invention.

Block 300 illustrates performing the step of coupling a first storage device having a first form factor and a first height to a computer through a controller;

Block 302 illustrates performing the step of coupling a second storage device having the first form factor and a second height to the computer through the controller, such that the first storage device and the second storage device comprise a single storage device for the computer and fit within a standard cage of the computer.

Block 304 illustrates performing the step of storing data on the first storage device based on instructions received from the controller.

Block 306 illustrates performing the step of storing data on the second storage device based on instructions received from the controller.

Conclusion

In summary, the present invention discloses an apparatus and method for providing selectively redundant storage within a computer. The device comprises a first storage device having a first form factor and a first height, a second storage device having the first form factor and a second height, coupled to the first storage device, such that the first form factor, first height, and second height allow the first storage device and second storage device to fit within a standard cage of a computer, and a controller, coupled to the first and second storage device, for selectively storing data on the first storage device and the second storage device, wherein the controller interfaces to the computer and presents the first storage device and the second storage device as a single storage device to the computer.

The method comprises coupling a first storage device having a first form factor and a first height to a computer through a controller, coupling a second storage device having the first form factor and a second height to the computer through the controller, such that the first storage device and the second storage device comprise a single storage device for the computer and fit within a standard cage of the computer, storing data on the first storage device based on instructions received from the controller, and storing data on the second storage device based on instructions received from the controller.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A selectively redundant storage device, comprising:
    a first storage device having a first form factor including a first height, a first length and a first width;
    a second storage device having a second form factor including a second height, a second length, and a second width,
    the second form factor being substantially identical to the first form factor,
    the second storage device being arranged adjacent to the first storage device in a stack, such that the first and second storage device are positioned in parallel planes of the stack; and
    a controller for selectively storing data on the first storage device and the second storage device,
    the controller being horizontally oriented and positioned in a parallel plane adjacent the first and second storage devices in the stack, wherein a length and width of the controller are co-extensive with the fist and second lengths and first and second widths of the fist and second storage devices in the stack;
    wherein the first and second storage devices and the controller are arranged to fit within a standard cage of a computer.

2. The storage device of claim 1, wherein data is stored in a non-redundant fashion.

3. The storage device of claim 1, wherein data is stored in a redundant fashion.

4. The storage device of claim 3, wherein data is stored in a RAID 1 protected redundancy fashion.

5. The storage device of claim 1, wherein the first storage device and the second storage device are selected from a group comprising a disk drive, a CD-ROM drive, a tape drive, and an optical storage media.

6. The storage device of claim 1, wherein the controller interfaces with the computer with a redundant interface.

7. A method for storing data on a storage device, comprising:
- coupling a first storage device having a first form factor and a first height to a computer through a controller;
- coupling a second storage device having the first form factor and a second height to the computer through the controller, such that the first storage device, the second storage device and the controller are arranged with adjacent parallel planar surfaces, stacked with the controller below the storage devices and comprise a single storage device for the computer and fit within a standard cage of the computer;
- storing data on the first storage device based on instructions received from the controller; and
- storing data on the second storage device based on instructions received from the controller.

8. The method of claim 7, wherein data is stored in a non-redundant fashion.

9. The method of claim 7, wherein data is stored in a redundant fashion.

10. The method of claim 9, wherein data is stored in a RAID 1 protected redundancy fashion.

11. The method of claim 7, wherein the first storage device and the second storage device are selected from a group comprising a disk drive, a CD-ROM drive, a tape drive, and an optical storage media.

12. The method of claim 7, wherein the controller interfaces with the computer with a redundant interface.

* * * * *